United States Patent
Edelman et al.

(10) Patent No.: US 10,438,159 B2
(45) Date of Patent: Oct. 8, 2019

(54) ARCHITECTURE AND ASSOCIATED METHODOLOGY FOR DATA STANDARDIZATION AND UTILIZATION IN RETAIL INDUSTRY APPLICATIONS

(71) Applicant: Herofi, Inc., San Diego, CA (US)

(72) Inventors: Vladimir Edelman, Carlsbad, CA (US); Trent Dethloff, San Diego, CA (US)

(73) Assignee: Herofi Inc., San Diego, CA (US)

(*) Notice: Subject to any disclaimer, the term of this patent is extended or adjusted under 35 U.S.C. 154(b) by 372 days.

(21) Appl. No.: 15/356,931

(22) Filed: Nov. 21, 2016

(65) Prior Publication Data

US 2017/0068971 A1 Mar. 9, 2017

Related U.S. Application Data

(62) Division of application No. 14/954,394, filed on Nov. 30, 2015, now Pat. No. 9,501,793.

(Continued)

(51) Int. Cl.
*G06Q 30/02* (2012.01)
*G06Q 30/06* (2012.01)
(Continued)

(52) U.S. Cl.
CPC ... *G06Q 10/06398* (2013.01); *G06K 7/10366* (2013.01); *G06Q 20/20* (2013.01);
(Continued)

(58) Field of Classification Search
None
See application file for complete search history.

(56) References Cited

U.S. PATENT DOCUMENTS 5,815,369 A * 9/1998 Quesada .................. G06F 1/16
200/292
6,996,560 B1 * 2/2006 Choi ...................... G06Q 30/02
(Continued)

OTHER PUBLICATIONS

Anon., "DataCore Extends Storage Hypervisor Tiering to Provide Enterprises with Seamless Access to Cost Effective Cloud Storage," Business Wire, Oct. 4, 2011. (Year: 2011).*

(Continued)

*Primary Examiner* — Nicholas D Rosen
(74) *Attorney, Agent, or Firm* — Thibault Patent Group (57) ABSTRACT

A system, method and server are described for creating customized, in-store customer experiences. In one embodiment, a method is described, comprising receiving proprietary retail data from a first retail establishment over a wide-area network, the proprietary retail data comprising customer purchasing information formatted in a first proprietary format, converting the proprietary retail data into a standard retail data format to produce standardized retail data, receiving an indication from the first retail establishment over the wide-area network that an event relating to the first retail establishment has occurred, and in response to receiving the indication, retrieving standardized retail data relating to the customer from a memory, and providing at least some of the standardized retail data related to the customer to the retail establishment for presentation to the customer.

16 Claims, 4 Drawing Sheets

Related U.S. Application Data (60) Provisional application No. 62/171,109, filed on Jun. 4, 2015.

(51) Int. Cl.
  *G06Q 20/20* (2012.01)
  *G06Q 10/06* (2012.01)
  *G06K 7/10* (2006.01)
  *G06Q 99/00* (2006.01)
  *G06Q 50/00* (2012.01)

(52) U.S. Cl.
  CPC ..... *G06Q 30/0201* (2013.01); *G06Q 30/0251* (2013.01); *G06Q 30/0252* (2013.01); *G06Q 30/0641* (2013.01); *G06Q 30/06* (2013.01); *G06Q 50/01* (2013.01); *G06Q 99/00* (2013.01)

(56) References Cited

U.S. PATENT DOCUMENTS

| | | | | |
|---|---|---|---|---|
| 7,254,418 | B2* | 8/2007 | Iwasaki | H04L 63/0853 455/411 |
| 8,086,678 | B2* | 12/2011 | Heredia | G06F 15/16 709/206 |
| 8,271,322 | B2* | 9/2012 | Ariyibi | G06Q 30/02 14/25 |
| 8,755,511 | B2* | 6/2014 | Duva | G06Q 30/0246 379/201.01 |
| 9,111,290 | B2* | 8/2015 | Delgado | G06Q 30/02 |
| 9,495,682 | B2* | 11/2016 | Vallier | G06Q 30/02 |
| 9,501,793 | B1* | 11/2016 | Edelman | G06Q 30/0641 |
| 10,096,046 | B2* | 10/2018 | Mathews | G06F 16/95 |
| 2003/0125083 | A1* | 7/2003 | Iwasaki | H04L 63/0853 455/558 |
| 2004/0138954 | A1* | 7/2004 | Norton | G06Q 10/087 705/16 |
| 2007/0250426 | A1* | 10/2007 | Demirjian | G06Q 30/02 705/36 R |
| 2008/0059297 | A1* | 3/2008 | Vallier | G06Q 30/02 705/14.27 |
| 2008/0262940 | A1* | 10/2008 | Kovach | G06Q 10/087 705/26.2 |
| 2009/0083385 | A1* | 3/2009 | Heredia | G06F 15/16 709/206 |
| 2010/0023401 | A1* | 1/2010 | Ariyibi | G06Q 30/02 705/14.58 |
| 2012/0324375 | A1* | 12/2012 | Mathews | G06F 16/95 715/760 |
| 2013/0046589 | A1* | 2/2013 | Grigg | G06Q 30/02 705/14.1 |
| 2013/0046632 | A1* | 2/2013 | Grigg | G06Q 30/02 705/14.58 |
| 2013/0081146 | A1* | 3/2013 | Hakozaki | H04N 1/00222 726/28 |
| 2013/0151381 | A1* | 6/2013 | Klein | G06Q 30/0641 705/27.1 |
| 2013/0297422 | A1* | 11/2013 | Hunter | G06Q 30/0261 705/14.58 |
| 2013/0346199 | A1* | 12/2013 | Brook | G06Q 30/0255 705/14.53 |
| 2014/0058831 | A1* | 2/2014 | Duva | G06Q 30/0246 705/14.45 |
| 2014/0129328 | A1* | 5/2014 | Mathew | G06Q 30/00 705/14.53 |
| 2015/0074531 | A1* | 3/2015 | Morris | G06F 3/0482 715/716 |
| 2015/0112826 | A1* | 4/2015 | Crutchfield, Jr. | G06Q 30/0601 705/26.1 |
| 2015/0112838 | A1* | 4/2015 | Li | H04W 4/21 705/26.61 |
| 2015/0269642 | A1* | 9/2015 | Cai | G06Q 30/0613 705/14.49 |
| 2016/0162913 | A1* | 6/2016 | Linden | G06Q 30/0202 705/7.31 |

OTHER PUBLICATIONS

Minsker, M., "Path to Personalized Customer Journeys," Customer Relationship Management, 19.2 (Feb. 2015), pp. 20-24. (Year: 2015).*

* cited by examiner

ARCHITECTURE AND ASSOCIATED METHODOLOGY FOR DATA STANDARDIZATION AND UTILIZATION IN RETAIL INDUSTRY APPLICATIONS

CLAIM OF PRIORITY

This application is a Divisional of U.S. patent application Ser. No. 14/954,394, filed on Nov. 30, 2015, which claims the benefit of U.S. provisional application Ser. No. 62/171,109 filed on Jun. 4, 2015.

BACKGROUND

I. Field of Use

The present application relates to the field of data management and consumer experience design. More specifically, the present application relates to a system, apparatus and method for using retail and personal customer data to create tailored user experiences to customers of retail establishments.

II. Description of the Related Art

Retail establishments have embraced powerful data systems over the years to support their businesses. For example, computerized Point of Sales (POS) systems have been used to allow electronic payments, manage inventory, and determine purchasing habits of their customers. More recently, Customer Relationship Management (CRM) systems have been used to identify consumer trends and predict future consumer purchasing behaviors. Many of these systems have been in use for years.

One drawback of such "legacy" point-of-sale systems, however, is that the information produced by these systems is typically formatted in a proprietary manner unique to each type of system, and the various brands of these systems. Thus, data generated by an NCR POS system is formatted differently than data generated by a Micros system. Therefore, data generated by these systems and services available through them cannot easily be used for other purposes or by other applications. In order to do so, custom software development is needed on the part of both the legacy system developers, as well as developers of the new functionality. This requires a great deal of time and money to develop.

Thus, it would be desirable to use the proprietary information produced by legacy retail systems and the services offered by these systems in other applications without having to develop customized software solutions for each individual legacy piece of software used.

SUMMARY

The embodiments described herein relate to systems, methods and apparatus for generating customized, in-store customer experiences for retail establishments to provide to their customers.

In one embodiment, a method is described, comprising receiving proprietary retail data from a first retail establishment over a wide-area network, the proprietary retail data comprising customer purchasing information formatted in a first proprietary format, converting the proprietary retail data into a standard retail data format to produce standardized retail data, receiving an indication from the first retail establishment over the wide-area network that an event relating to the first retail establishment has occurred, and in response to receiving the indication, retrieving standardized retail data relating to the customer from a memory, and providing at least some of the standardized retail data related to the customer to the retail establishment for presentation to the customer.

In another embodiment, a server is described, comprising a network interface for receiving proprietary retail data from a first retail establishment over a wide-area network, the proprietary retail data comprising customer purchasing information formatted in a first proprietary format, a memory for storing the standardized retail data and processor-executable instructions, a processor couple to the network interface and to the memory for executing the processor-executable instructions that cause the server to receive the proprietary retail data from the retail establishment via the network interface convert the proprietary retail data into a standard retail data format to produce standardized retail data, receive an indication from the retail establishment over the wide-area network that an event relating to the retail establishment has occurred, and in response to receiving the indication, retrieve standardized retail data relating to the customer from a memory, and provide at least some of the standardized retail data related to the customer to the retail establishment for presentation to the customer.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Embodiments of the present invention comprise systems, methods, and apparatus for generating customized, in-store customer experiences using standardized retail data and/or personal customer data for retail establishments using standardized commands. Generally, proprietary customer information generated by traditional retail systems is provided to a server, where it is converted into standardized data formats. Other data may be received and converted into standard formats as well, such as customers' personal information from social media websites. Once the information is standardized, it can be used by the server for use in generating in-store customer experiences for each retailer. In-store customer experiences, otherwise referred to herein as "personalized customer user experiences" or "customized user experiences", refer to providing customized advertisements, desirable video and images, music, lighting, frictionless payment, location-based rewards points, and other features to customers while they are shopping on-site at a retailer's place of business. By standardizing data, both from retail systems and from personal information sources available on public websites, retailers can quickly and easily provide customized user experiences to their customers no matter what type of legacy retail systems they are presently using, and without regard to the various formats used by different websites that may supply the personal customer data.

Figure 1:
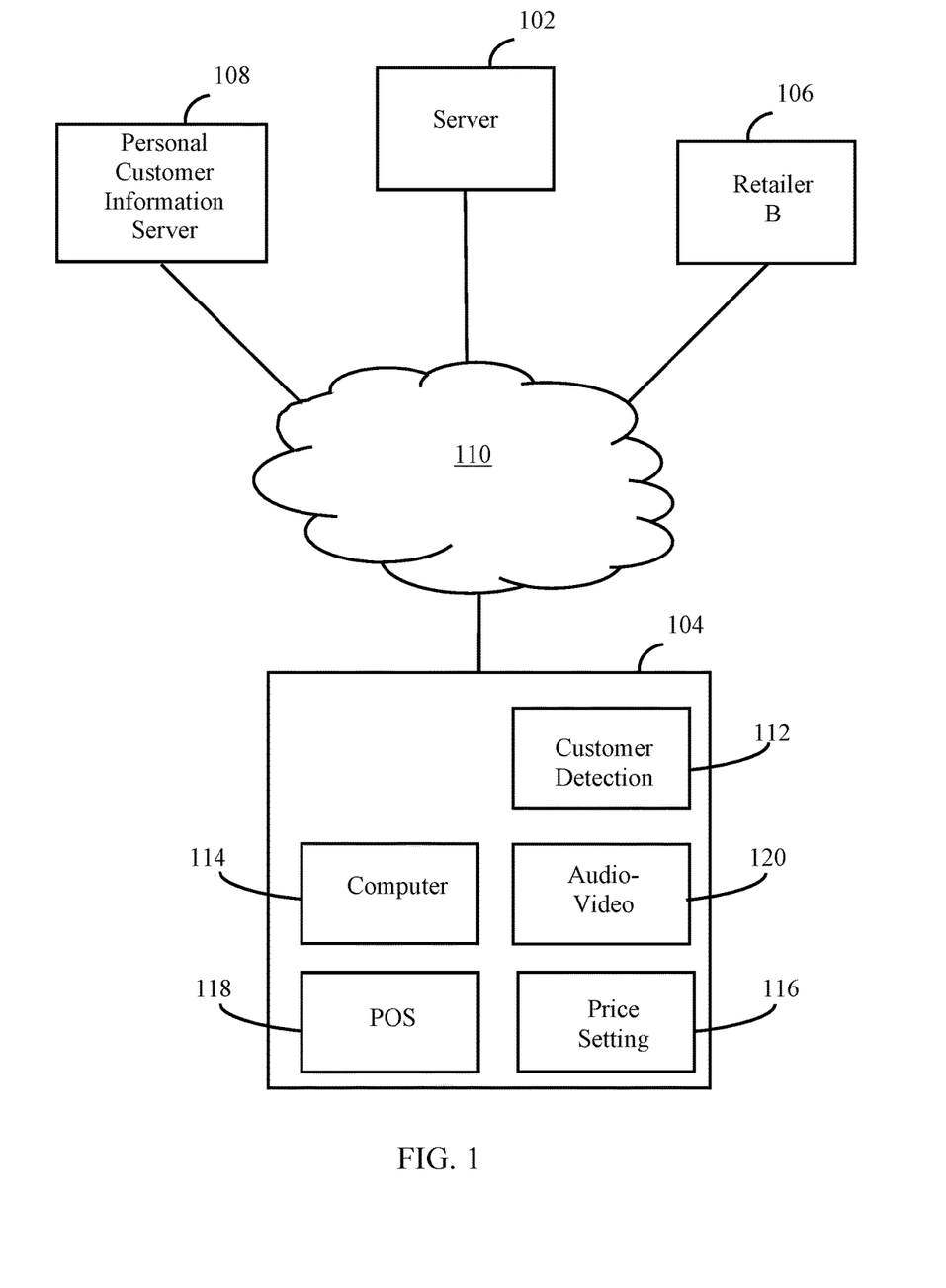
FIG. 1 illustrates one embodiment of a system for generating customized, in-store customer experiences.

FIG. 1 illustrates one embodiment of a system 100 for generating customized, in-store customer experiences using standardized retail data and/or standardized, personal customer data, using standardized commands to server 102. Shown are server 102, retailers 104 and 106, and personal customer information server 108. Additional components of retailer 104 are shown, comprising customer detection system 112, computer 114, price setting system 116, point-of-sale (POS) system 118, and audio-video system 120. At least some of these components, and perhaps others not shown in FIG. 1, may reside at retailer 104 and other retailers, in varying combinations. It should be understood that although only two retailers 104 and 106 are shown in FIG. 1, in actual use, server 102 may accommodate many other retailers to allow each retailer to provide their own in-store customized customer experiences for their respective customers. Further, for purposes of clarity, only retailer 104 will be described in detail, below. It should be understood that retailer 106, as well as other retailers will operate similarly.

Retailer 104 is in communication with server 102 via computer 114 and one or more wide-area networks 110. Computer 114 typically comprises a common PC or Mac personal computer, or a server, and is coupled to wide-area network via a local-area LAN (not shown) and to customer detection system 112, price setting system 116, retail system(s) 118, audio-visual system 120, and/or other devices, not shown. Wide-area network 110 comprises one or more wide-area communication systems, such as the Internet, cellular data systems, satellite data systems, fiber optic communication systems, etc. Server 102 standardizes and "abstracts" proprietary retail data provided by retailer 104 and provides proprietary commands to retailer 104 based on the type of retail equipment used by retailer 104. This enables retailer 104 to provide in-store, customized experiences for its customers, no matter what type of retail equipment is used by retailer 104 or if retailer 104 switches to using different retail systems in the future to conduct its businesses. The system 100 allows retailer 104 to offer these personalized user experiences cheaper and faster than what would otherwise be possible, through the use of standardized data and modern SDK/APIs to access the standardized data. In this way, the system 100 acts as an abstraction layer between legacy retail systems and the capabilities of quickly-evolving consumer applications.

Retailer 104 may wish to offer customized, in-store customer experiences to its customers or potential customers when they visit or are near retailer 104. For example, when a customer enters retailer 104, retailer 104 may automatically identify the customer using customer detection system 112 in conjunction with a database residing either at computer 114 or at server 102. Customer detection system 112 may use such hardware and techniques as an RFID reader, a low-emission Bluetooth beacon placed near the entrance of retailer 104 to read and identify a personal electronic device carried by customers as they enter retailer 104, or a facial recognition system. Customer detection system 112 may also comprise, simply, an IR beam-interruption device, motion sensor, or other device to detect when a customer has entered a retail establishment whether or not customers are carrying a personal electronic device. The information obtained by customer detection system 112 from such devices (e.g., serial number, MIN, EIN, IMEI, RDID tag, etc.) is compared to information stored either locally at retailer 104 or by server 102 to associate the device with a particular customer. After the customer has been identified, server 102, or computer 114 in another embodiment, is accessed to obtain standardized data pertaining to the identified customer. The standardized data may comprise standardized retail data generated from retail systems in use by retailer 104, or from multiple retailers or multiple locations of a chain of retailers associated with retailer 104. Such data may include customer purchasing information, such as customer names, customer phone numbers, customer email addresses, average dollars spend per item, average dollars spend per visit, shopping frequency, payment type, credit card information, etc. The standardized data may, alternatively or in addition to the standardized retail data, comprise personal information, i.e., "personal customer data" obtained from one or more non-legacy information sources 108, such as customers' digital media content (e.g., digital photos, videos, music), social media information (e.g., tweets and posts), contact information (e.g., "friends", "followers", email addresses, telephone numbers, addresses), social media account information (e.g., usernames for Facebook, Twitter, etc.), or other personal information. In general, the personal customer data comprises any data not generated by retail systems. The standardized data generated by server 102 is used by server 102 to create in-store customer experiences to attract and retain customers. The in-store customer experiences may comprise playing music from a customer's favorite radio station, displaying one or more of a customer's photographs or videos on video monitors located throughout the store, providing a coupon to a customer's mobile phone based on the customer's previous shopping habits, and/or providing credit card information automatically to a retailer as a customer checks out, pre-ordering a favorite food or beverage, automatically calling a cab, among many others. These actions are instigated by server 102 providing proprietary commands to the various retail devices in accordance with the make and model of each retail device.

Retailers 104 and 106 each may comprise a typical "brick-and-mortar" retail establishment that sells clothing, electronics, toys, food, beverages, and just about any kind of product or service to the general public. Personal customer information server 108, otherwise referred to herein as personal customer information server, comprise one or more general web servers, photo web servers, music streaming web servers, social media web servers, digital storage web servers, or any other digital storage system for storing personal information associated with an individual.

Each retailer typically uses one or more retail data systems to conduct business. For example, a legacy POS system is typically used to allow customers to pay for their purchases and for retailers to manage inventory. Typical legacy POS systems record retail data for each transaction, for example, item name, item SKU number, retail price, customer name, credit card information, date and time of transaction, etc. Customer Relationship Management (CRM) legacy systems may also be used to help retailers identify consumer trends and predict future consumer purchasing behaviors. Enterprise Risk Management (ERM) legacy systems are used to evaluate and manage risk.

Legacy retail systems typically comprise older, expensive hardware located either on the premises of a retail establishment, off-site, or a combination of both to facilitate retail transactions, including, for example, POS terminals such as those offered by NCR and similar companies. Each brand of POS equipment typically stores its retail data in a proprietary format. For example, in a purchase transaction, POS brand A may create a transaction type "PURCHASE", comprising retail data elements of "ITEM DESCRIPTION", "ITEM SKU", "TRANSACTION DATE" (in format mm/dd/yyyy), "TRANSACTION TIME" (in a 12 hour time format), "CUSTOMER NAME" (in "first name, last name" format, and "CREDIT CARD NUMBER". At another retail establishment, a similar purchase transaction may be recorded by POS brand B as a transaction type named "TRANSACTION", comprising retail data elements of "TRANSACTION TYPE" (e.g., purchase, return), "ITEM SKU", "TRANSACTION DATE" (in format dd-mm-yyyy), "TRANSACTION TIME" (in a 24 "military" hour time format), "CUSTOMER NAME" (in "last name, first name" format), and "CREDIT CARD NUMBER". As evident, each transaction describes a purchase transaction, but using different data elements and/or different data formats or syntax to store the information associated with the transaction. If retailer 104, for example, using POS brand A wanted to offer customized, in-store customer experiences, it would have to create a custom software application that could properly use the transaction information in the proprietary format used by POS brand A to create such customized, in-store customer experiences. Retailer 106 using POS brand B would likewise have to create a custom software application to properly use the proprietary data format used by POS brand B. Embodiments of the present invention allow retailers 104 and 106 to use a common, non-custom software application to create customized, in-house customer experiences, no matter what brand of legacy retail systems are used.

While the discussion thus far has described server 102 creating in-store, customize user experiences, in another embodiment, computer 402 may provide much or all of the functionality provided by server 102. In this embodiment, computer 402 may obtain periodic updates comprising standardized retail and personal customer data of a retailer's customers and generate in-store customer experiences when a predefined event occurs. When a predefined event occurs, computer 402 may access the standardized legacy and personal customer data stored by computer 402 and, for example, cause audio-video system 120 to display a slideshow featuring photographs from the identified customer's/potential customer's Facebook page and to play the identified customer's/potential customer's favorite music as identified in the personal customer data.

Figure 2:
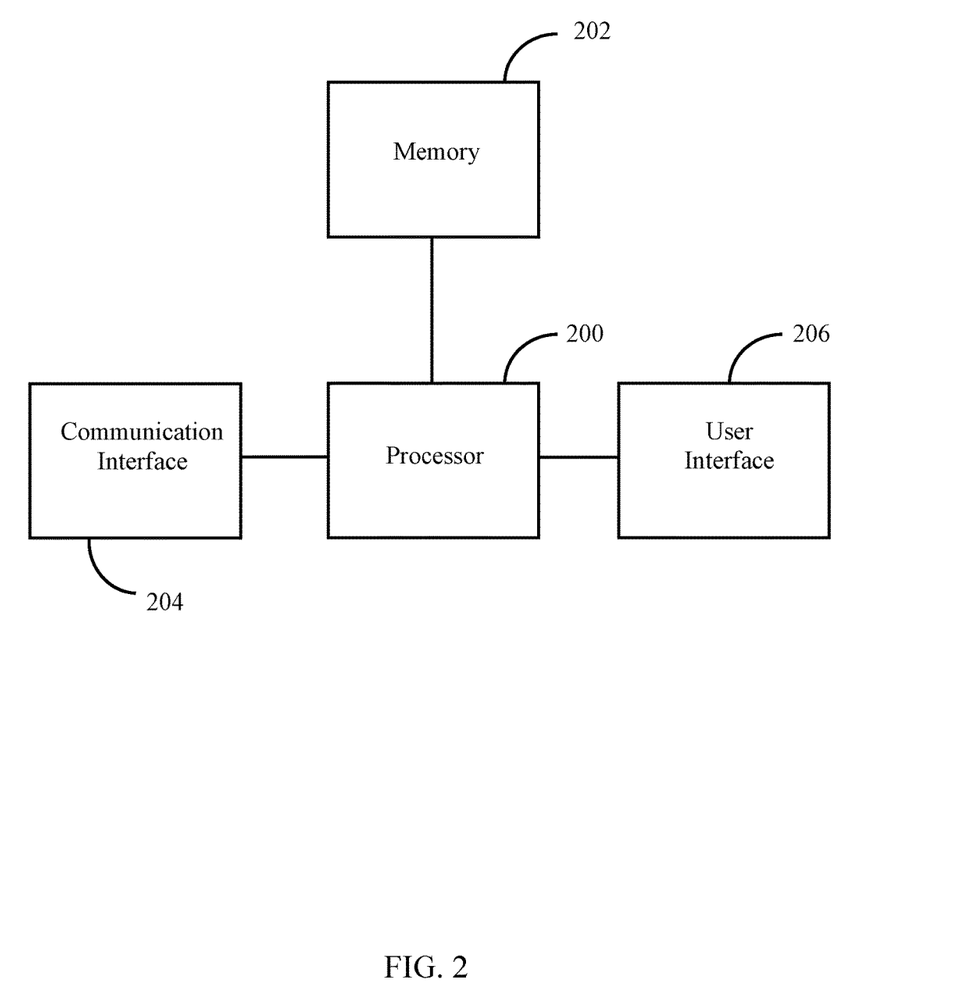
FIG. 2 illustrates a functional block diagram of one embodiment of a sever shown in FIG. 1 for generating customized, in-store customer experiences.

FIG. 2 illustrates a functional block diagram of one embodiment of sever 102. Specifically, FIG. 2 shows processor 200, memory 202, network interface 204, and optional user interface 206. It should be understood that the functional blocks shown in FIG. 2 may be connected to one another in a variety of ways, and that not all functional blocks necessary for operation of sever 102 are shown (such as a power supply) for purposes of clarity.

Processor 200 is configured to provide general operation of sever 102 by executing processor-executable instructions stored in memory 202, for example, executable code, to receive proprietary retail and personal customer data, convert the retail and personal customer data into standardized formats, and to provide the standardized data to retailers to provide customized, in-store customer experiences. Processor 200 also manages data flow in and out of server 102 in accordance with business and contractual rules as directed by retail establishments. Processor 200 is typically a general purpose microprocessor or microcontroller, such as any one of a number of Pentium® class microprocessors manufactured by Intel Corporation of Santa Clara, Calif.

Memory 202 comprises one or more information storage devices, such as RAM, ROM, EEPROM, UVPROM, flash memory, SD memory, XD memory, or virtually any other type of electronic memory device. Memory 202 is used to store the processor-executable instructions for operation of sever 102 as well as any information used by processor 200, such as the retail and personal customer data, the standardized versions of this information, as well as mapping information used to convert the retail and personal customer data into standardized data formats.

Optional user interface 206 may be coupled to processor 200 and allows an individual access to information stored in memory 202, as well as to provide server updates and maintenance. User interface 206 may comprise one or more pushbuttons, switches, sensors, touchscreens, keypads, keyboards, ports, and/or microphones that generate electronic signals for use by processor 200 upon initiation by a user. User interface 206 may additionally comprise one or more visual display devices for display of information to users. Of course, the aforementioned items could be used alone or in combination with each other and other devices may be alternatively, or additionally, used.

Network interface 204 comprises circuitry necessary for processor 200 to communicate with retailers, personal customer information servers, application servers, and customer devices over wide-area network 110 using data formats well known in the art.

Figure 3A:
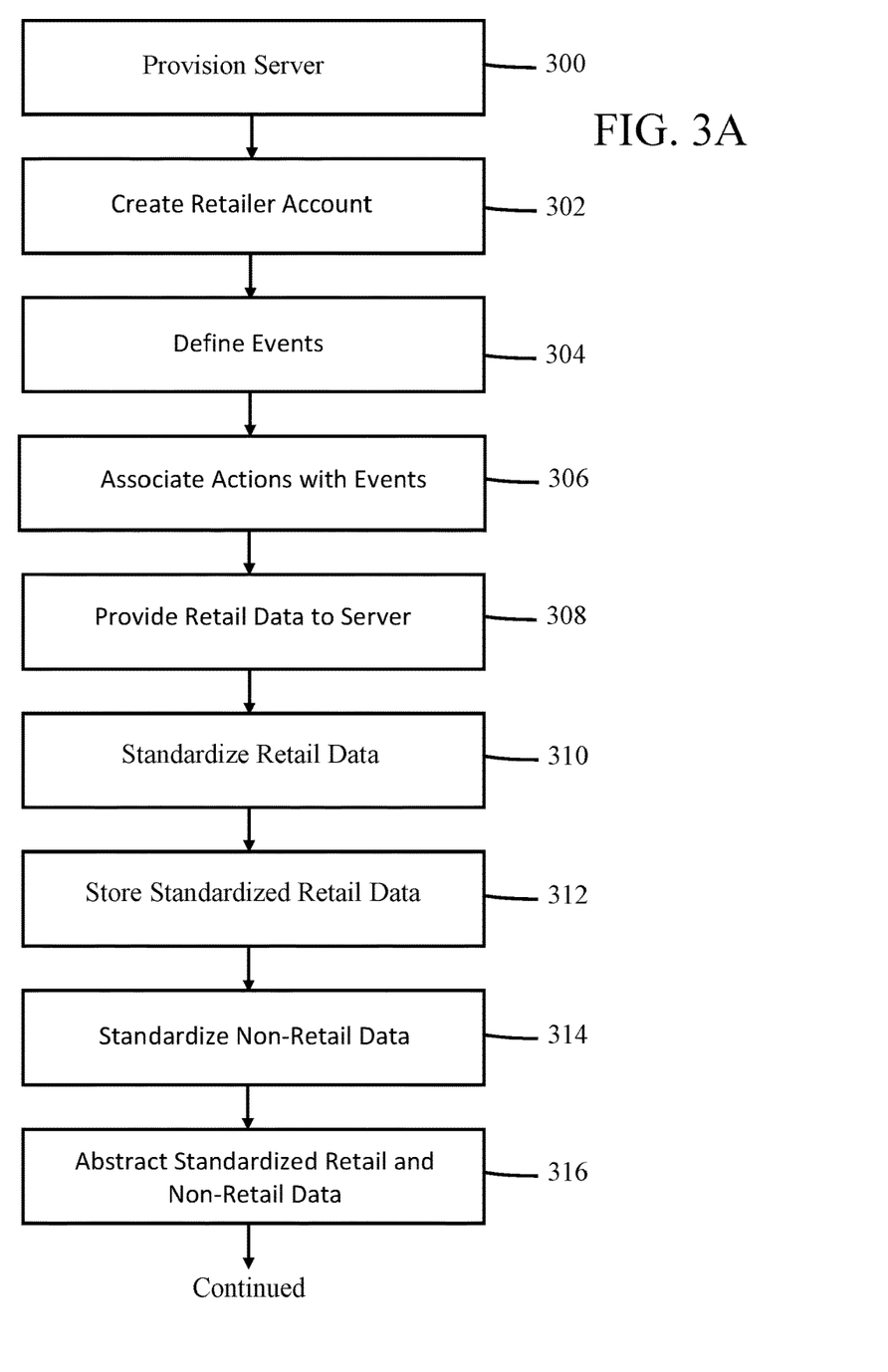
FIGS. 3a and 3b are flow diagrams illustrating one embodiment of a method executed by the server shown in FIGS. 1 and 2 for generating customized, in-store customer experiences.
Figure 3B:
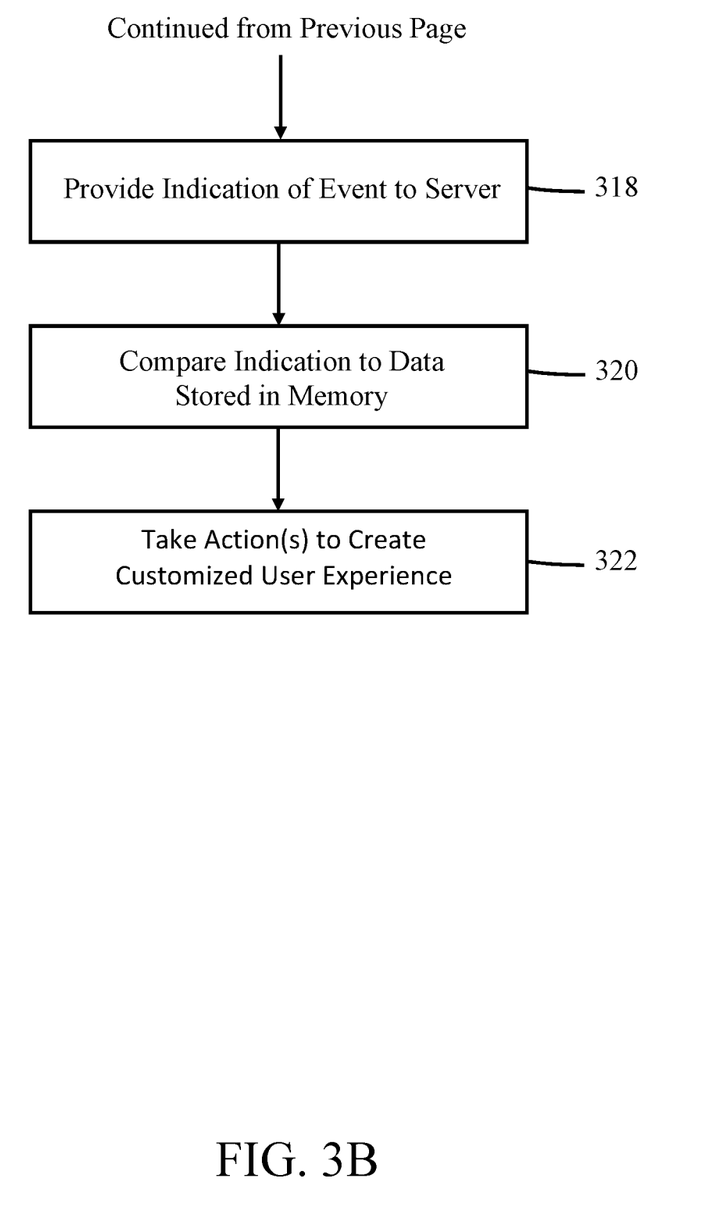

FIG. 3 is a flow diagram illustrating one embodiment of a method executed by server 102 for generating customized, in-store customer experiences using standardized retail and/or personal customer data for retail establishments to provide to their customers. It should be understood that the steps described in this method could be performed in an order other than what is shown and discussed, and that minor steps have been omitted for clarity.

At block 300, server 102 may be provisioned with address information pertaining to a plurality of personal customer information servers, for example, personal customer information server 108 including social media web servers, photo-based web servers, music-related web servers, etc. The address information may be provided by a user of server 102, such as a retailer, or the information may be gathered automatically, for example, by "bots" with a consumer's explicit permission, or through abstracted records stored in various other systems relating to a consumer's demographic and historical behavior.

At block 302, server 102 creates an account for a particular retailer when server 102 receives a request to establish a new account, typically from an exchange of information with a retailer using a website provided by server 102, or a web server associated with server 102. The information provided by the retailer may comprise an identification of one or more devices or systems in use by the retailer, such as a legacy POS system, an Internet-based jukebox, audio/video equipment, such as a set-top box, smart media player, or other Internet-based TV/audio controller. This information may be used by server 102 in order to properly format commands to each of these retail devices/systems located within a retailer's premises, such as audio-video system 120, POS system 118, price-setting system 116, and so on.

At block 304, the retailer defines one or more "events" that may occur with respect to the retail establishment. For example, one "event" can be defined as when a previous customer is identified as he or she enters a retail establishment. Customers may be identified as they enter a retail establishment as described above. Another event may be defined as when an unidentified customer enters a retail establishment (for example, someone who isn't carrying a smart phone or someone who has never visited a particular retail establishment). Another event may be defined as when a customer purchases a certain amount of goods or services, such as when a customer of the sports bar has ordered $50 worth of food and/or drinks, 5 drinks, etc. Yet another event could be defined as when a previous customer has not visited the retail establishment in a period of time, say, 30 days. Server 102 may offer a variety of predetermined events for a retailer to choose from, or the retailer may enter "free-format" events, defined as the retailer chooses. In any case, the retailer provides an indication to server 102, via wide-area network 110, of a number of events that that the retailer has defined and, in one embodiment, additionally provides details about each event, such as information pertaining to what triggers each defined event.

At block 306, one or more actions are associated with each event, representing an in-store, customized customer experience, again by the retailer typically using the web interface. The actions are performed seamlessly by server 102 no matter what type of retail systems are used by the retailer or format of the personal customer information, as server 102 has previously stored identifying information of various retail devices/systems provided by retailer 104 at block 302. Based on the identifying information, server 102 can convert actions identified by retailer 104 into commands that can be used by the particular retail devices/systems used by retailer 104. For example, the owner of a sports bar may associate three actions with an event that he has defined/selected as when a person enters his sports bar and is identified as having previously purchased food or drinks from the sports bar. The actions, in this example, include a) sending a text message to such a person, b) automatically order the person's favorite drink from the bar, and c) display a game on a TV monitor featuring one of the customer's favorite sports teams. As before when defining events, server 102 may display a number of actions for the retailer to take for each event, or the retailer may define his own actions. The actions displayed by server 102 are "generic" in the sense that each retailer may select the same action (e.g., play a customer's favorite streaming music station), no matter what type of audio equipment each retailer may have. Each action is translated by server 102 in accordance with mapping information stored in memory 202 that converts a generic command (e.g., play user's favorite streaming music station) into the proper format for the particular devices/systems used by each retailer.

In one embodiment, certain actions defined by retailer 104 may require business and/or contractual rules to be followed by server 102. For example, if a POS system at retailer 104 indicates that a customer has drank more than five beers, an action defined by retailer 104 might be for server 102 to hail a taxi or other ride services such as Uber and Lyft, but only if the taxi company or other ride service provides a destination where the customer is going. Such information may be very valuable to retailer 104. In this example, when server 102 contacts a taxi or other ride service, the taxi or other ride service may have made a contractual promise to provide the customer's destination to the retailer 104 via server 102 after the customer has provided a destination to the taxi or other ride service. Once this information has been received, it may be stored in association with the customer's personal information and used in the future by retailer 104, for example, to mail promotional items to the customer's location.

At block 308, after an account is created and events/actions defined, retail data is provided by the retailer to server 102. This may occur via the website, by providing queries on the website for the retail establishment to manually enter the legacy data or by providing access to the retail establishment's legacy retail system(s). Alternatively, or in addition, the retail data is provided automatically via a direct connection between server 102 and the retailer's legacy retail system(s). The retail data may be provided by allowing server 102 to "pull" the legacy data from the legacy retail system(s) or by allowing the legacy retail system(s) to "push" the retail data to server 102 at predetermined intervals, such as once per day, upon the occurrence of each retail transaction, etc. For example, the retail data may comprise details of each retail transaction by customers of the retail establishment and may include such data elements as customer name, customer address, purchase amount, item/service identification, date and time of purchase, etc. This information is generally provided to server 102 by the retailer in a proprietary format unique to the particular legacy retail system(s) used by the retailer.

At block 310, the proprietary retail information provided by the retail establishment is standardized by processor 200 executing processor-readable instructions stored on a non-transient tangible medium, for example memory 202. Processor 200 evaluates the proprietary retail data first to determine which proprietary format the retail data has been encoded and/or which brand of retail system the data originated. This may be accomplished by comparing the proprietary retail data to known proprietary formats to determine which format the retail data best fits. Alternatively, the retail data may comprise identifying information as to the brand of retail system that produced the proprietary retail data. In another embodiment, a retailer may provide explicit identification information of any retail systems associated with the retail establishment when defining events and associated actions, as described above at blocks 304 and 306.

Once the proprietary format has been determined, the proprietary retail data is converted into a standardized format in accordance with mapping information stored in memory 202. The mapping information provides a template on how to "map", or convert, the proprietary retail data into the standardized format. For example, if the retail data was determined to have originated from an NCR retail legacy system, processor 200 accesses formatting information pertaining to the NCR format, stored in memory 202, to assign each data element in the proprietary retail data to the standardized format. In one embodiment, the proprietary retail data may comprise different transaction types, such as a "PURCHASE" type, a "RETURN" type, etc. In this embodiment, processor 200 first determines the transaction type of the proprietary retail data, then assigns the data elements of the proprietary retail data to data elements in the standardized format in accordance with formatting information stored in memory 202 pertaining to an NCR PURCHASE transaction type. In one embodiment, the mapping information is pre-loaded into memory 202 after manual engineering efforts have analyzed a number of retail system formats and determined which data elements from proprietary formats map to a standard format for each transaction type.

For example, the proprietary retail data may comprise information pertaining to numerous transactions that have occurred in the past 24 hours between the retail establishment and their customers. For each transaction, the retail data received at block 308 comprises a particular transaction type, such as a PURCHASE transaction type or a RETURNS transaction type. In some proprietary retail systems, the transaction type may be encoded as a data element within a broader context. For example, some legacy retail systems may generate a transaction type as a generic "TRANSACTION" data type, then use a "sub"-transaction type defining what kind of transaction occurred between a customer and a retail establishment. In any case, after determining the proprietary format and the transaction type of the proprietary retail data, processor 200 assigns data elements in each transaction type to data elements of a standardized format. For example, the transaction type PURCHASE may comprise data elements of "customer name" in format LAST NAME, FIRST NAME, "purchase price" expressed in dollars, "item description" in the format of an "SKU", "date of purchase" in format mm/dd/yyyy, and "time of purchase" in a 24 hour format. A standardized PURCHASE transaction type is pre-defined and stored in memory 202 comprising data elements of "customer name" in formation FIRST NAME, MIDDLE INITIAL, LAST NAME, "item identification" in a 20 character alpha-numeric format, "purchase price" expressed in dollars, "date of purchase" in format mm/dd/yy, "time of purchase" in a 12 hour format, and "store location" in a format of CITY, STATE to identify which store location the transaction occurred. Processor 200 populates the standardized PURCHASE transaction using the mapping information stored in memory 202. For example, the mapping information indicates that the customer name of a purchase transaction in the format identified at block 310 is the first data element in a format of "LAST NAME, FIRST NAME" and that the customer name is the first data element in the standardized purchase transaction type, listing the customer's first name, middle initial, then last name. Using this mapping information, processor 200 copies the first and last name of the customer from the legacy data element into the first standardized data element, re-arranged to list the customer's first name first, then the customer's last name. The customer's middle name is left blank, because the legacy customer name data element did not contain such information. As a general rule, in situations where data is lacking in the retail data that is included in the standardized retail data, no information is provided in the standardized data element, i.e., the standardized data element may be set to "blank" or to a default value, such as "null", "not provided", etc.

Thus, as proprietary retail data is received by server 102, the format of the data is identified, then data elements of the proprietary retail data are converted into data elements of a standardized format in accordance with mapping information stored in memory 202 to produce standardized retail data.

At block 312, the standardized retail data is stored in memory 202 for generating in-store, customized customer experiences upon the occurrence of one of the predefined events.

At block 314, in addition to standardizing retail data, server 102 may additionally or alternatively gather and, in one embodiment, store personal customer information, such as personal, publically-available customer information, and convert the personal customer data into one or more standardized formats. For example, for any customer identified in the retail data, server 102 may access one or more web servers (e.g., personal customer information server 108) via wide-area network 110 to search and retrieve personal customer data associated with each customer. Such "personal customer data" may comprise personal information such as photographic data from photo-sharing websites such as Shutterfly and Snapfish, any information posted to a customer's social media sites (e.g., Facebook, Twitter, Linkedin, etc.), such as previous posts, photographs, videos, friends information, current occupation, "favorites", etc. Personal customer data may further comprise music-related information, such as each customer's favorite streaming music services, favorite streaming music stations, favorite playlists, favorite songs, favorite artists, etc. Each type of information (e.g., photos, music, social media information) may be formatted differently depending on which website is being accessed. For example, photos on Snapfish may be saved in JPEG format and have a particular naming protocol while photos stored by Shutterfly might be stored in a GIF format and have a different naming protocol. The naming protocol may include such information as name given by customer, name given by photo web service, name of a person in a photo, a name of a photographer who took the photo, a location where the photo was taken, a date and time the photo was taken, etc. Processor 102 converts this "photographic information" from each of these two web sites into a common format, for example, into a data record having data elements comprising a digital file representing the digital photograph in JPG format, a date and time that the photograph was taken (in a 12-hr time format, and a month-day-year (4 digits) date format), the name of the photographer, and one or more names associated with the photograph, i.e., shown in the photograph. Thus, as in the examples describing how processor 102 converts retail data into standardized data, personal customer data is converted into standardized data types, i.e., digital photograph in this example. Other examples of data type may include, "video", "music/song", "text message", "Facebook post", "Facebook friend", "recent contacts" (e.g., a list of one or more friends that a customer has emailed, texted, posted, etc.), and many other types of data. For each data type, a common format is predefined, comprising one or more data elements that are associated with each particular, predefined data type, and mapping information for each data type is stored in memory 202 for use by processor 102 to convert the personal customer data.

In one embodiment, the personal customer data is obtained by server 102 in response to communications with a retail establishment. For example, server 102 may search for personal customer information only upon receipt of retail data associated with a customer, or upon the occurrence of a predefined event that identifies a particular customer. In other embodiments, server 102 obtains personal customer data on an on-going basis without communications from a retail establishment. For example, once a customer has been identified from the receipt of retail data, server 102 may obtain personal customer data associated with the customer periodically, for example, on a daily basis without further communication from the retail establishment that provided the customer's identification information. In this embodiment, the personal customer data is stored by processor 200 in memory 202 for use in future requests for customer data by retail establishments.

At block 316, both the standardized retail and personal customer data may be "abstracted" for use in a variety of different devices, i.e., stored in a number of display formats to account for differences in the hardware/display capabilities of various devices. For example, a first version of the standardized retail and personal customer data may be stored for use in devices that run the Android operating system, while a second version of the standardized retail and personal customer data may be stored for use in devices that run Microsoft Explorer. The standardized, abstracted data is then stored in memory 202.

At block 318, at some later time, one of the predefined events may occur and an indication of the event provided to server 102 from retailer 104 via wide area network 110. The indication may comprise an event identification code that identifies which event has occurred (e.g., event code 1 defined as when a previous customer has entered the premises). The indication also typically comprises customer identification information that identifies a customer, such as a customer name, social security number, telephone number, account number, etc. Such customer information may be obtained by automatically identifying customers when they are inside or near a retail establishment, for example by using BLE beacon devices, RFID systems, Wi-Fi, Bluetooth, GPS, beam-interruption devices, or similar technology, or some other technology to determine when a particular customer is within or nearby a retail establishment. The indication may also comprise an identification of the retailer or a location where the event occurred.

In response to receiving the indication at block 318, at block 320, processor 200 compares the identification information in the indication to a database of retailers who have created accounts with server 102. Such a database is typically stored in memory 202. When a match is found, processor 200 then compares the event identification code to event codes stored in memory 202 in association with the identified retailer. When a match is found, processor 200 creates an in-store, customized user experience for the identified customer at block 320, in accordance with pre-defined actions associated with the particular event and the particular customer.

At block 322, processor 200 may use the standardized retail data and/or standardized personal customer data to take one or more actions, as defined by the actions that were pre-assigned to the particular event by the retailer. These actions represent in-store, customized customer experiences. For example, if the retailer defined three actions when a known customer enters a retail establishment, processor 200 initiates the three actions. For example, if one of the pre-defined actions was to send a text message to the customer, processor 200 retrieves a phone number or an email address of the customer, in a standardized format, from memory 202, if such information was previously provided by retail data from the retailer. The body of the message may also be retrieved from memory 202, such as a generic welcome message, or the body may be tailored to the customer, such as when the action defined by the retailer instructs processor 200 to determine how may rewards points the customer may have on account with the retailer, and inform the customer of the number of rewards points are available for use by the customer. Another action defined by the retailer might be for processor 200 to determine the customer's favorite or most-ordered food or beverage item and send an order to an order-creation point-of-sale system of the retailer, which causes a food or beverage order to be placed with retail employees. The command to order the customer's favorite food or beverage item from server 102 is in a format compatible with the particular POS system in use by the retailer, as provided by the retailer at block 302. Yet another action defined by the retailer may be for processor 200 to retrieve any photographs or videos posted on the customer's social media website, which has been previously retrieved, standardized and stored in memory 202, and provided them to audio-video system 120 located at the retailer's establishment for presentation to audio-video system 120 the customer. Again, the photographs or videos are provided to the retailer's audio-video system 120 in a format capable of being understood by the particular type or brand of audio-video system 120, including a command to display the photographs or videos and the actual photographic/video information itself. Server 102 consults memory 202 to determine the type of audio-video equipment in use by the retailer, and formats the photographs or video in accordance with mapping information stored in memory 102 for the identified audio-video equipment. Each of the aforementioned actions may be provided to computer 114 for distribution to the various retail devices/systems, or it may be provided directly to these devices/systems via wide-area network 110 if the retailer provides network identification information for various devices/systems, such as an IP address, to server 102 while providing information relevant to the retailer's devices/systems back in block 302.

The methods or algorithms described in connection with the embodiments disclosed herein may be embodied directly in hardware, in processor-executable instructions executed by a processor, or in a combination of the two. The processor-executable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, various embodiments of the ideas presented herein may include a computer readable media embodying a code or processor-readable instructions to implement the methods of operation of the system in accordance with the methods, processes, algorithms, blocks and/or functions disclosed herein.

While the foregoing disclosure shows illustrative embodiments of the invention, it should be noted that various changes and modifications could be made herein without departing from the scope of the invention as defined by the appended claims. The functions, blocks and/or actions of the method claims in accordance with the embodiments of the invention described herein need not be performed in any particular order. Furthermore, although elements of the invention may be described or claimed in the singular, the plural is contemplated unless limitation to the singular is explicitly stated.

We claim:

1. A method performed by a server for providing customized, instore shopping experiences for retail customers of a retail establishment, comprising:

receiving, by a processor coupled to a network interface, an identification of a first event, the first event comprising a retail customer entering the retail establishment;

receiving, by the processor via the network interface, an identification of a first instore shopping experience to be presented in the retail establishment, the first instore shopping experience comprising playing a streaming music station featuring a favorite music artist of the retail customer;

storing, by the processor in a memory coupled to the processor, the identification of the event and the identification of the first instore shopping experience;

receiving, by the processor via the network interface, an indication that the retail customer has entered the retail establishment and an identity of the retail customer;

obtaining, by the processor via the network interface, a favorite music artist of the retail customer from a social media website;

identifying, by the processor via the network interface, a streaming music station featuring the favorite music artist; and causing, by the processor via the network interface, the streaming music station to play on a sound system located at the retail establishment.

2. The method of claim 1, further comprising:
receiving, by the processor via the network interface, an identification of a second instore shopping experience to be presented in the retail establishment when the retail customer enters the retail establishment, the second instore shopping experience comprising displaying a photograph previously posted to one or more social media web sites by the retail customer on monitors located throughout the at the retail establishment;
storing, by the processor in the memory, the identification of the second instore shopping experience;
in response to determining the identity of the retail customer, retrieving the photograph from one of the social media web sites; and
causing the photograph to be displayed on the monitors in the retail establishment.

3. The method of claim 1, further comprising:
receiving, by the processor via the network interface, an identification of a second instore shopping experience to be presented in the retail establishment when the retail customer enters the retail establishment, the second instore shopping experience comprising displaying a first retail item for sale at the retail establishment at a first price similar to a second price previously paid by the retail customer for a second retail item;
storing, by the processor in the memory, the identification of the second instore shopping experience;
in response to determining the identity of the retail customer, retrieving an identification of the second retail item and the second price paid by the retail customer; and
causing the first retail item to be displayed on monitors located in the retail establishment.

4. The method of claim 3, further comprising:
reducing, by the processor, the first price of the first retail item to generate a reduced price of the first retail item; and
displaying the first retail item on the monitors at the reduced price.

5. The method of claim 3, wherein the first price is in a proprietary format in accordance with a particular point-of-sale system, the method further comprising:
receiving, by the processor via the network interface, the first price in the proprietary format from the point-of-sale system;
converting, by the processor, the first price in the proprietary format into a standard data format; and
providing, by the processor via the network interface, the first price in the standard data format to the retail establishment.

6. The method of claim 1, further comprising:
receiving, by the processor via the network interface, an identification of a second instore shopping experience to be presented in the retail establishment when the retail customer enters the retail establishment, the second instore shopping experience comprising displaying a retail item for sale at the retail establishment similar to a previously purchased item by the retail customer;
storing, by the processor in the memory, the identification of the second instore shopping experience;
in response to determining the identity of the retail customer, retrieving an identification of the previously purchased item by the retail customer; and
causing the retail item to be displayed on monitors located in the retail establishment.

7. The method of claim 6, wherein an indication of the retail item is in a proprietary format in accordance with a particular point-of-sale system, the method of further comprising:
receiving, by the processor via the network interface, the first price in the proprietary format from the point-of-sale system;
converting, by the processor, the first price in the proprietary format into a standard data format; and
providing, by the processor via the network interface, the first price in the standard data format to the retail establishment.

8. The method of claim 1, wherein the first instore shopping experience excludes any retail advertisements.

9. A server for providing customized, instore shopping experiences for retail customers at a retail establishment, comprising:
a network interface for allowing communication over a wide-area network;
a memory for storing processor-executable instructions; and
a processor coupled to the network interface and the memory for executing the processor-executable instructions that cause the server to:
receive, by a processor coupled to a network interface, an identification of a first event, the first event comprising a retail customer entering the retail establishment;
receive, by the processor via the network interface, an identification of a first instore shopping experience to be presented in the retail establishment, the first instore shopping experience comprising playing a streaming music station featuring a favorite music artist of the retail customer;
store, by the processor in a memory coupled to the processor, the identification of the event and the identification of the first instore shopping experience;
receive, by the processor via the network interface, an indication that the retail customer has entered the retail establishment and an identity of the retail customer;
obtain, by the processor via the network interface, a favorite music artist of the retail customer from a social media website;
identify, by the processor via the network interface, a streaming music station featuring the favorite music artist; and
cause, by the processor via the network interface, the streaming music station to play on a sound system located at the retail establishment.

10. The server of claim 9, wherein the processor-executable instructions further comprise instructions that cause the server to:
receive, by the processor via the network interface, an identification of a second instore shopping experience to be presented in the retail establishment when the retail customer enters the retail establishment, the second instore shopping experience comprising displaying a photograph previously posted to one or more social media web sites by the retail customer on monitors located throughout the at the retail establishment;
store, by the processor in the memory, the identification of the second instore shopping experience;
in response to determining the identity of the retail customer, retrieve the photograph from one of the social media web sites; and
cause the photograph to be displayed on the monitors in the retail establishment.

11. The server of claim 9, wherein the processor-executable instructions further comprise instructions that cause the server to:
receive, by the processor via the network interface, an identification of a second instore shopping experience to be presented in the retail establishment when the retail customer enters the retail establishment, the second instore shopping experience comprising displaying a first retail item for sale at the retail establishment at a first price similar to a second price previously paid by the retail customer for a second retail item;
store, by the processor in the memory, the identification of the second instore shopping experience;
in response to determining the identity of the retail customer, retrieve an identification of the second retail item and the second price paid by the retail customer; and
cause the first retail item to be displayed on monitors located in the retail establishment.

12. The server of claim 11, wherein the processor-executable instructions further comprise instructions that cause the server to:
reduce, by the processor, the first price of the first retail item to generate a reduced price of the first retail item; and
display the first retail item on the monitors at the reduced price.

13. The server of claim 11, wherein the first price is in a proprietary format in accordance with a particular point-of-sale system, and the processor-executable instructions further comprise instructions that cause the server to:
receive, by the processor via the network interface, the first price in the proprietary format from the point-of-sale system;
convert, by the processor, the first price in the proprietary format into a standard data format; and
provide, by the processor via the network interface, the first price in the standard data format to the retail establishment.

14. The server of claim 9, wherein the processor-executable instructions further comprise instructions that cause the server to:
receive, by the processor via the network interface, an identification of a second instore shopping experience to be presented in the retail establishment when the retail customer enters the retail establishment, the second instore shopping experience comprising displaying a retail item for sale at the retail establishment similar to a previously purchased item by the retail customer;
store, by the processor in the memory, the identification of the second instore shopping experience;
in response to determining the identity of the retail customer, retrieve an identification of the previously purchased item by the retail customer; and
cause the retail item to be displayed on monitors located in the retail establishment.

15. The server of claim 14, wherein the first price is in a proprietary format in accordance with a particular point-of-sale system, and the processor-executable instructions further comprise instructions that cause the server to:
receive, by the processor via the network interface, the first price in the proprietary format from the point-of-sale system;
convert, by the processor, the first price in the proprietary format into a standard data format; and
provide, by the processor via the network interface, the first price in the standard data format to the retail establishment.

16. The method of claim 9, wherein the first instore shopping experience excludes any retail advertisements.

* * * * *